US010516241B2

(12) United States Patent
Fritz et al.

(10) Patent No.: US 10,516,241 B2
(45) Date of Patent: Dec. 24, 2019

(54) AUDIO INTERCOM PLUG CONNECTOR

(71) Applicant: RIEDEL Communications International GmbH, Wuppertal (DE)

(72) Inventors: Wolfgang Fritz, Wuppertal (DE); Thomas Riedel, Wuppertal (DE)

(73) Assignee: RIEDEL COMMUNICATIONS INTERNATIONAL GMBH, Wuppertal (DE)

( * ) Notice: Subject to any disclaimer, the term of this patent is extended or adjusted under 35 U.S.C. 154(b) by 0 days.

(21) Appl. No.: 15/816,636

(22) Filed: Nov. 17, 2017

(65) Prior Publication Data
US 2018/0166836 A1 Jun. 14, 2018

(30) Foreign Application Priority Data

Dec. 14, 2016 (DE) .................. 10 2016 124 417
Mar. 31, 2017 (DE) .................. 10 2017 106 946

(51) Int. Cl.
*H01R 24/38* (2011.01)
*G06F 3/16* (2006.01)
*H01R 13/502* (2006.01)
*H01R 13/639* (2006.01)
*H01R 13/41* (2006.01)
*H01R 24/58* (2011.01)
*H01R 29/00* (2006.01)
*H01R 107/00* (2006.01)

(52) U.S. Cl.
CPC .............. *H01R 24/38* (2013.01); *G06F 3/16* (2013.01); *H01R 13/502* (2013.01); *H01R 13/639* (2013.01); *H01R 13/41* (2013.01); *H01R 24/58* (2013.01); *H01R 29/00* (2013.01); *H01R 2107/00* (2013.01); *H04B 2203/545* (2013.01)

(58) Field of Classification Search
CPC .............................. H01R 24/58; H01R 24/60
USPC ......................................... 439/668, 669, 650
See application file for complete search history.

(56) References Cited

U.S. PATENT DOCUMENTS

| 4,582,951 | A | 4/1986 | Shuttleworth | |
|---|---|---|---|---|
| 7,031,486 | B2 * | 4/2006 | Hu | ........................ H01R 24/58 |
| | | | | 381/361 |
| 7,540,753 | B2 * | 6/2009 | Dobler | ............... H01R 13/6275 |
| | | | | 439/346 |
| 2008/0268692 | A1 | 10/2008 | Dobler | |
| 2016/0050505 | A1 | 2/2016 | Riedel | |

FOREIGN PATENT DOCUMENTS

| DE | 102014104811 A | 10/2015 |
|---|---|---|
| JP | 2003086300 A | 3/2003 |
| WO | 2005/048257 A1 | 5/2005 |

\* cited by examiner

*Primary Examiner* — Phuong K Dinh
(74) *Attorney, Agent, or Firm* — Andrew Wilford

(57) ABSTRACT

Presented and described is, amongst other items, an intercom plug-in connector (10) for audio connections, comprising a cylindrical housing (19) extending in the axial direction (27), in particular with a circular, or essentially circular, cross-section, whose first axial end (20) is formed by a plug-in extension (22) that on its front face (39) has a plurality of sockets (23*a*, 23*b*, 23*c*, 23*d*), in particular four sockets positioned relative to one another in an approximately V-shape, for contact pins (24*a*, 24*b*), and which at its second axial end (21) has a phone jack (25) for a phone plug (14).

13 Claims, 6 Drawing Sheets

Figure 1:
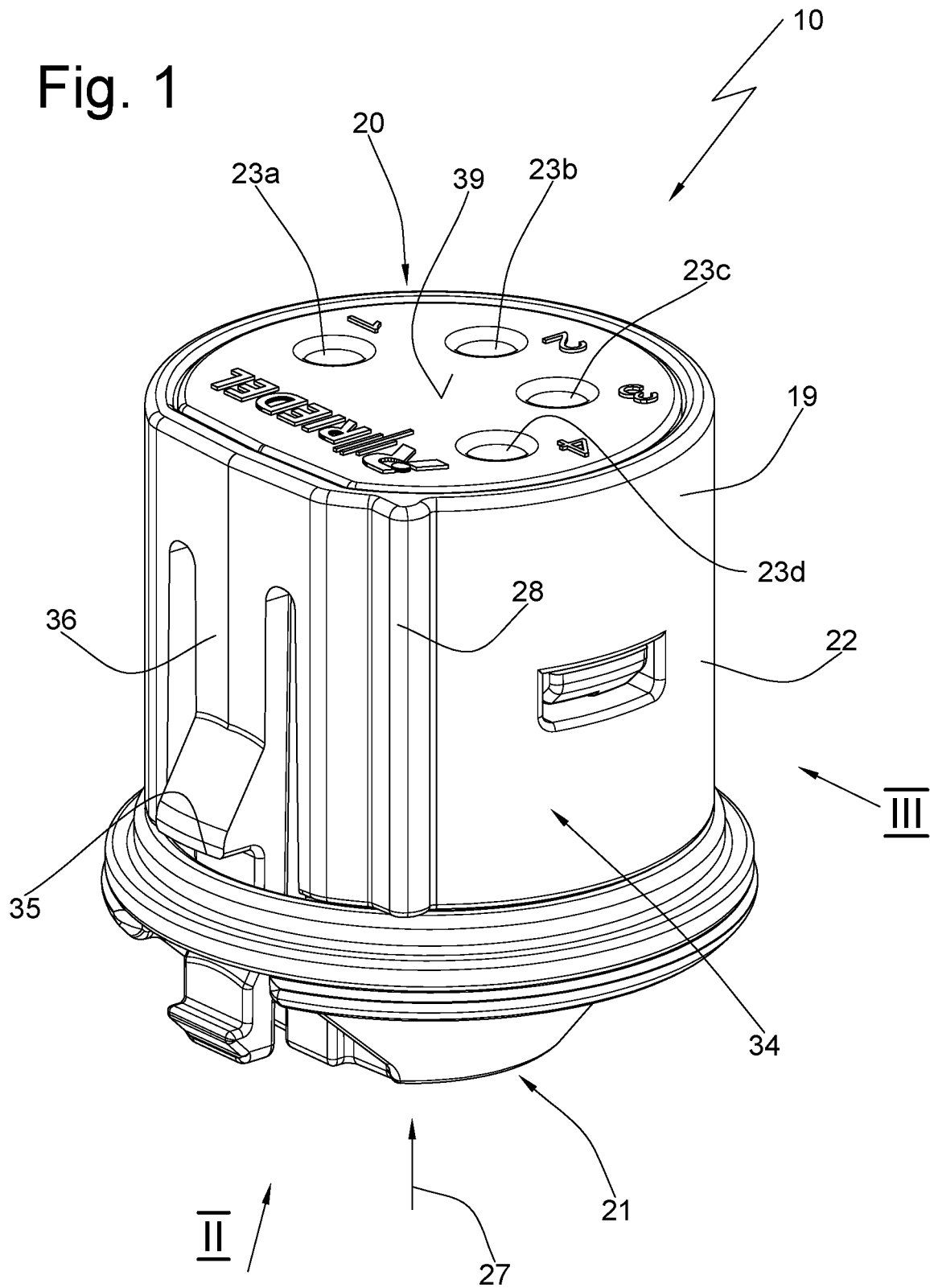

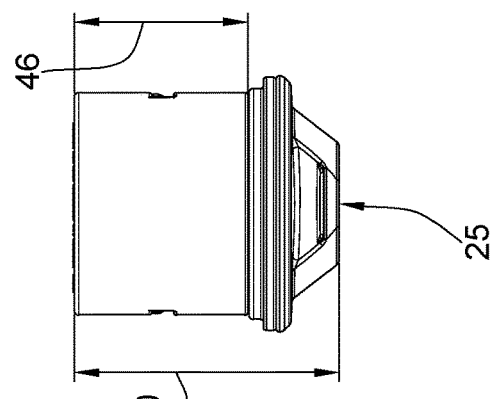
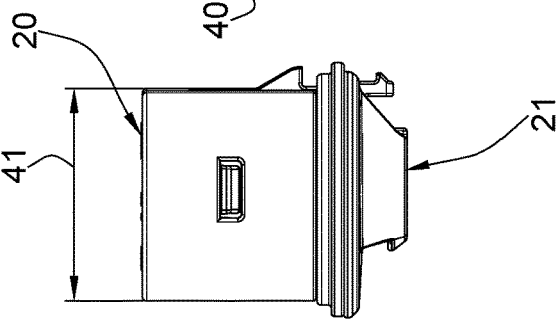
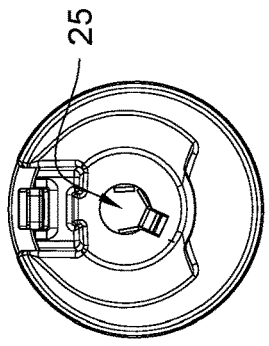
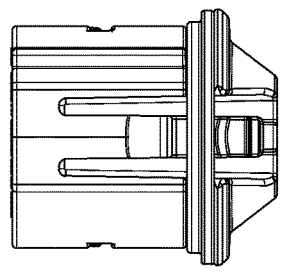
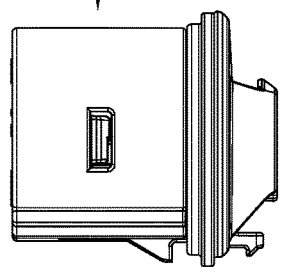
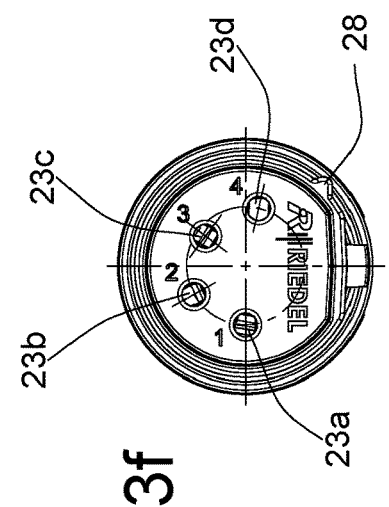

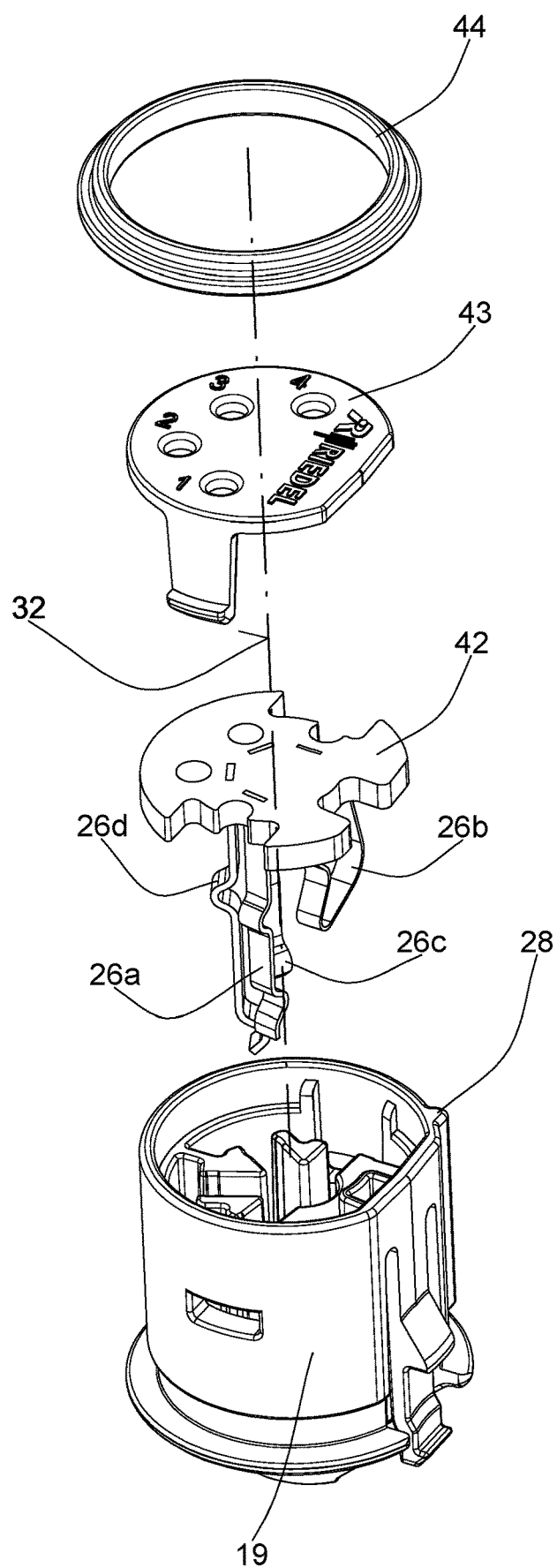

AUDIO INTERCOM PLUG CONNECTOR

The invention relates to an intercom plug-in connector for audio connections.

The applicant has been developing and distributing intercom networks for decades. These take the form of networks for real-time audio communications, with which activities, events, sporting events, etc. can be transmitted, commented upon, and monitored.

Intercom networks can have different members. As a rule, stations are connected directly or by way of mobile end user devices such as belt packs, microphones or headsets to so-called exchanges—as centers of an intercom network.

By way of example only, reference is made here to the following German patent applications of the applicant, in which such intercom networks and their components are described: DE 10 2014 011 963 [US 2016/0050505], DE 10 2014 104 811, DE 10 2016 123 966, and DE 10 2016 123 968.

The headsets and microphones used in the professional intercom field usually have a four-pin plug-in connector that is designed as a female plug-in connector. This is also referred to as an XLR 4-pin female connector.

In particular, the headsets used in the professional intercom field have a connection cable, at the end of which cable is fitted an XLR 4-pin female plug-in connector or plug.

The belt packs or stations to be carried by the operator have a corresponding male connector (housing socket) that is designed to accommodate an XLR 4-pin female plug-in connector.

With the belt pack or the station audio communication can then be carried out with another member of the intercom network, by way of the exchange of the intercom network.

In certain applications, there can be a desire not to connect the belt pack or station to a headset with an XLR 4-pole female connector, but to connect a headset, microphone, or other electrical audio device, that has a plug.

Such a connection to the station is not possible because of the male connector (housing socket) provided.

Based on the prior art as described, the present invention seeks to provide an audio plug-in connector that enables as required an uncomplicated and secure connection of a headset, microphone or other electronic audio device with a phone plug to a station, in particular to a mobile station.

This object is achieved by the invention with the features of claim 1.

The principle of the invention is essentially to provide an intercom plug-in connector for audio connections that is of a very compact design. A first axial end of the intercom plug-in connector is designed as an XLR 4-pole female connector, and the opposite axial region is designed as a phone jack or socket for a phone plug.

Four sockets for contact pins are provided on the first axial end; these are positioned relative to one another in an approximate V-shape. The sockets are arranged on the front side on a plug-in extension of a cylindrical housing. The cylindrical housing advantageously has a circular cross section.

A phone jack or socket for a phone plug is arranged on the second axial end of the cylindrical housing. A plurality of contact elements, for example, four contact elements, are assigned to the phone jack for the plug. The number of contact elements corresponds to the number of contact sections on the phone plug that are electrically insulated from one another. The phone plug preferably has four or more contact sections. Similarly in this respect, four contact elements are assigned to the jack for the plug.

A contact element is also respectively assigned to each of the sockets for a contact pin.

In particular, provision can be made for the contact elements to extend from the jack for the phone plug to the sockets for the contact pins. In this way a very advantageous and compact wiring through the body of the cylindrical housing can be achieved.

The housing can be designed to be cast, clipped, screwed or at least essentially hermetically sealed relative to the exterior space.

In accordance with the invention, an intercom plug-in connector is provided which converts an audio headset as a component of an intercom network directly as required in the manner of an adapter from a phone plug to an XLR 4-pole female connector.

The phone jack for the phone plug can have an inside diameter of, for example, 3.5 mm, or alternatively, 2.5 mm. Accordingly the phone jack can serve to accommodate a phone plug with an external diameter of 3.5 mm, or 2.5 mm.

This makes it possible to connect a headset, microphone or another audio device using the phone jack for the phone plug directly to a station of an intercom network, or to another member of an intercom network, or to plug into a housing socket there present. Headsets, microphones or other electrical audio devices often have such plugs.

The inventive intercom plug-in connector comprises a cylindrical housing that extends axially. The housing advantageously has a circular, or an essentially circular, cross-section. By using circular cross-sections, handling is particularly optimized.

The cylindrical housing has a first and a second axial end. The first axial end is designed as a plug-in extension. It can, for example, have an axial length of about 15 millimeters. In particular, the plug-in extension can have an external diameter that is somewhat less than the inside diameter of the XLR male socket (housing socket) arranged on the station. The cylindrical housing can also have an annular end face in the manner of a stop shoulder or stop step.

Four sockets are positioned on the front face of the plug-in extension. These are aligned with one another essentially symmetrically with respect to a central plane, and are positioned relative to one another in an approximate V-shape when viewed in a frontal view. They serve to receive contact pins of the housing socket designed as a XLR 4-pole male plug-in connector. These contact pins can be introduced into the sockets in the course of a relative movement between the intercom plug-in connector and the housing socket, and provide electrical contacts.

A phone jack or socket for a phone plug is provided on a second end of the intercom plug-in connection. Four contact elements are assigned to the latter—corresponding to the number of contact sections on the plug. The contact sections on the phone plug are designed in the manner of annular bodies. The four contact sections are electrically insulated from one another. An insulating material, for example plastic, can be arranged between each pair of contact sections.

When the phone plug is plugged in and the intercom plug-in connector is plugged into the housing socket the electrical contact elements or conductors arranged in the cylindrical housing of the intercom plug-in connection in each case connect electrically with a contact pin located in a socket with, in each case, one or more of the contact sections of the plug.

Provision is advantageously made for the rearmost contact section, in the insertion direction of the plug, to be connected to ground.

In accordance with a further advantageous embodiment of the invention, the rearmost contact section, in the insertion direction of the plug, is connected to ground. By this means, particularly safe handling can be achieved.

In accordance with a further advantageous embodiment of the invention, the intercom plug-in connector is designed for purposes of connecting an intercom audio device, such as a headset, to an intercom network device, such as stations. By this means, particularly convenient handling of an intercom network can be achieved.

In accordance with a further advantageous embodiment of the invention, the plug-in extension has a slightly reduced external diameter compared with the external diameter of the housing socket. By this means, a secure and protected, and, if required, sealed housing of the electrical contact element is ensured. In addition, by this means a kind of stop shoulder can be provided which limits the placement movement axially of an inventive intercom plug-in connection on the housing socket.

In accordance with a further advantageous embodiment of the invention, an axially extending, radially outwardly projecting, rib is arranged on the plug-in extension of the intercom plug-in connection. Here this takes the form of an orientation or guide rib that ensures a secure management of a plug-in connection between the intercom plug-in connection and the housing-side socket by a predetermined circumferential rotational positioning.

In accordance with a further advantageous embodiment of the invention, the phone jack or socket for the phone plug has an inside diameter of 3.5 or 2.5 millimeters. Thus with the aid of the inventive intercom plug-in connector a particularly convenient connection of a headset, microphone or other audio device to an intercom network can be achieved.

In accordance with a further advantageous embodiment of the invention, the phone plug has an external diameter of 2.5 millimeters. By this means a connection of a belt pack or a microphone unit with a headset, microphone or other electronic audio device with a phone plug to the network can be ensured in a particularly advantageous manner.

Figure 2:
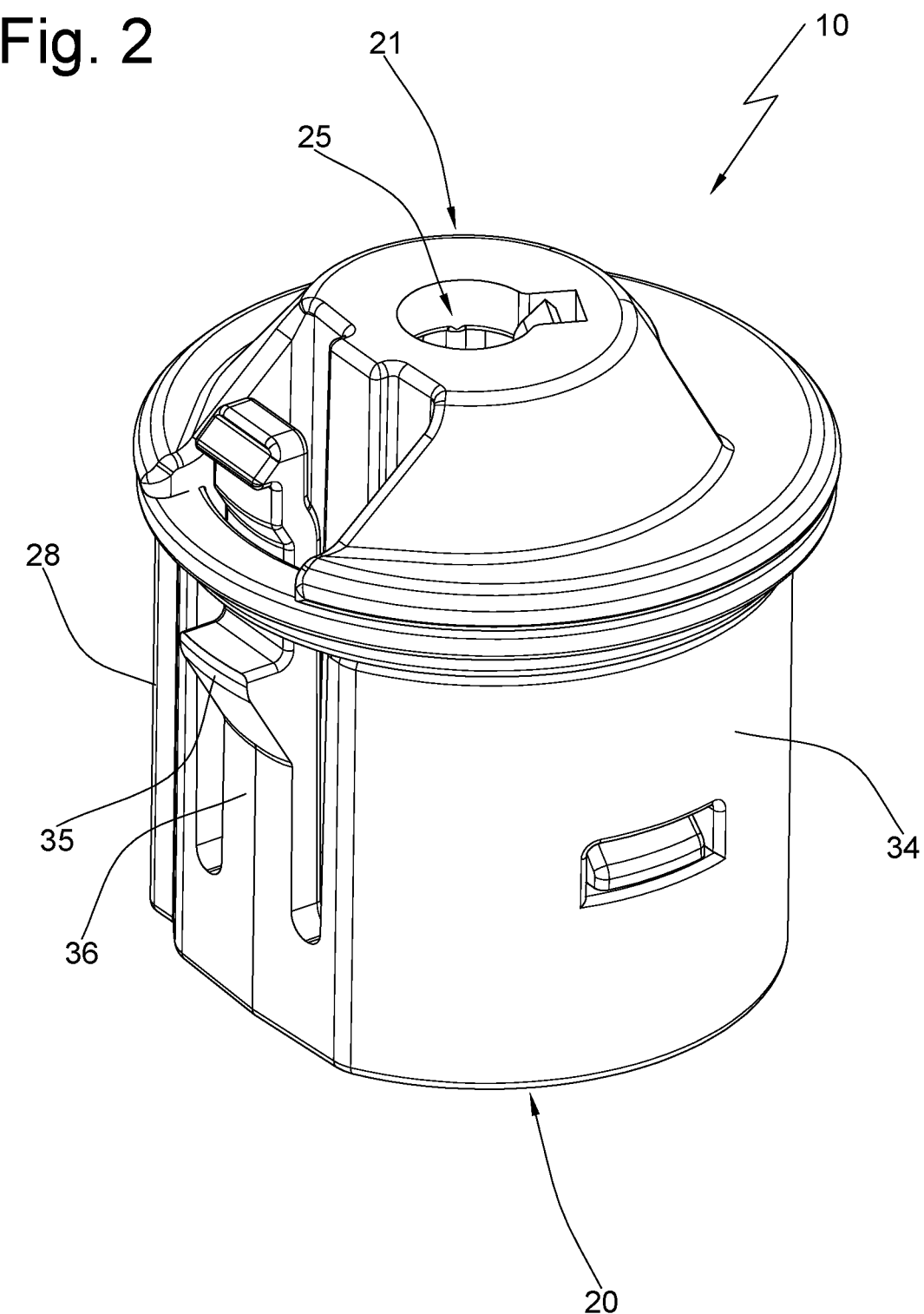
Figure 5:
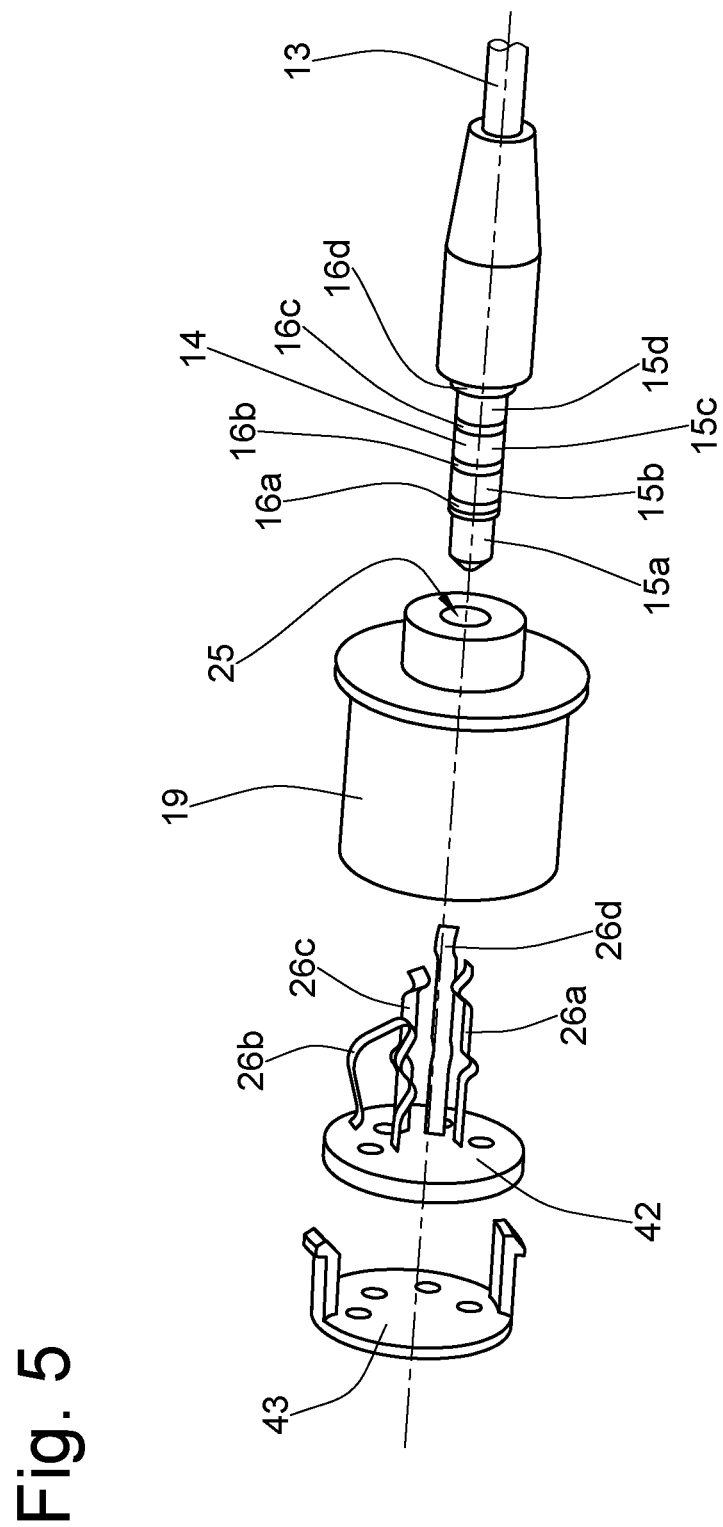
Figure 7:
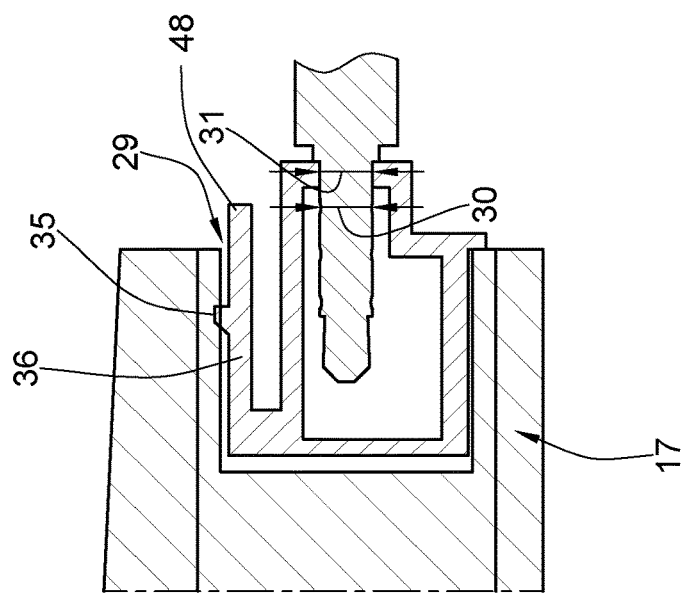
Figure 6:
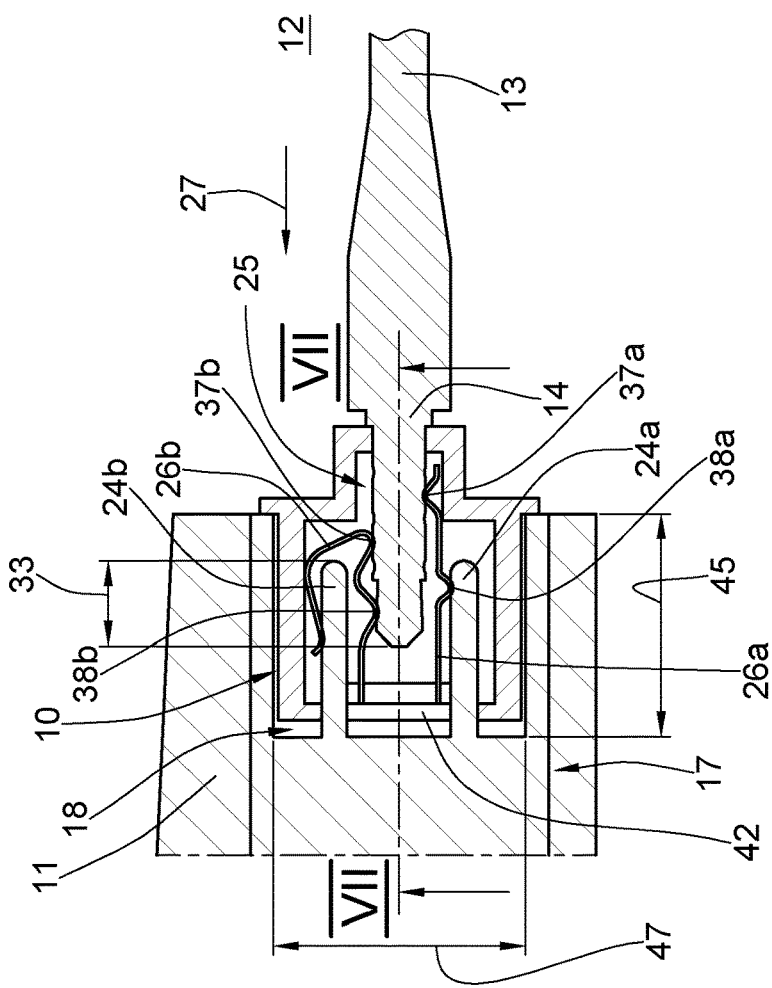

Further advantages of the invention ensue from the non-cited subsidiary claims, and from the embodiments of the invention described with the aid of the figures. Here:

FIG. 1 shows in a schematic perspective view a first example of embodiment of an intercom plug-in connector according to the invention, FIG. 2 shows the intercom plug-in connector of FIG. 1 in a view approximately aligned with the viewing arrow II in FIG. 1, FIG. 3a shows the intercom plug-in connector of FIG. 1 approximately aligned with the viewing arrow II in FIG. 1, in a side view, FIG. 3b shows the intercom plug-in connector of FIG. 3a, approximately aligned with the viewing arrow IIIb in FIG. 3a, FIG. 3c shows the intercom plug-in connector of FIG. 3b in a side view aligned with the viewing arrow IIIc in FIG. 3b, FIG. 3d shows the intercom plug-in connector of FIG. 3a in a side view aligned with the viewing arrow IIId in FIG. 3a, FIG. 3e shows the intercom plug-in connector of FIG. 3a in a bottom view aligned with the viewing arrow IIIe in FIG. 3a, FIG. 3f shows the intercom plug-in connector of FIG. 3a in a top view aligned with the viewing arrow IIIf in FIG. 3a, FIG. 4 shows depictions of individual components of the intercom plug-in connector of FIG. 1 in an exploded view, FIG. 5 shows in perspective the intercom plug-in connector of FIG. 1, with its essential components separated in an exploded view, with a phone plug shown schematically and a truncated section of the cable to be connected to a headset, FIG. 6 shows a partially sectioned schematic illustration of the connection region between the phone plug and a housing socket arranged on a belt pack, together with the intercom plug-in connector of FIG. 1 in a schematic sectional view with indications of the contact elements, and FIG. 7 shows a partially sectioned schematic view of the connection region of FIG. 6, approximately along the sectional line VII-VII in FIG. 6.

Embodiments of the invention are described by way of example in the following description of the figures, also with reference to the drawings. Here, for the sake of clarity—even if different embodiments are involved—identical or comparable parts or elements or regions are designated with the same reference symbols, sometimes with the addition of lower case letters.

Within the context of the invention features that are described only with respect to one example of embodiment can be provided in any other example of embodiment of the invention. Such modified embodiments are covered by the invention, even if they are not shown in the drawings.

All features disclosed are essential to the invention. In the disclosure of the application, the disclosure content of the associated priority documents (copy of the prior application), together with the cited documents and the devices of the prior art described are hereby incorporated in full, also for the purpose of including one or more features of these documents in one or more claims of the present application.

In the drawings the inventive intercom plug-in connector 10 is designated in its entirety as 10.

The inventive intercom plug-in connector 10 serves to connect a station 11 with a headset 12.

FIG. 6 shows—very schematically—a phone plug 14 that is connected to a connection cable 13, shown only in truncated form. The other end of the connecting cable 13, not shown in FIG. 6, leads to a headset, also not shown that is located approximately at position 12 (not shown to scale).

The headset 12 is to be connected to a station 11 that is only indicated in a partial manner in FIGS. 6 and 7. The station 11 is part of an intercom network, not shown that can include a variety of members, including stationary stations and mobile stations. For example, a so-called belt pack is designated as a mobile station; in FIG. 6 this is designated as 17. Such belt packs have been developed and manufactured by the applicant for some time and represent the state of the art. A belt pack can be worn by an operator; in particular it can be worn on the belt, and can move with the operator. The belt pack usually has a communications module, by means of which it can exchange wireless or wired audio information with other members of the intercom network in duplex audio mode, that is to say, with simultaneous listening and speaking.

In the illustration of the invention, the belt pack 17 exemplified in the figures is intended to symbolize quite generally a mobile member of an intercom network, a so-called mobile station. However, the invention also includes applications in which the stations 11 are of a stationary design.

A belt pack 17 of the conventional type has a housing socket 18 that is shown in FIGS. 6 and 7. The housing socket 18 typically has an axial length 45 and an inside diameter 47.

The housing socket 18 on the belt pack 17 is designed to receive an XLR plug-in extension. In devices of the prior art, a headset 12 has a connecting line 13 that has a so-called XLR plug-in extension instead of the phone plug 14 shown in FIG. 6. Here in fact, this takes the form of an XLR 4-pole female plug-in extension. The connecting line 13 has four electrical lines, not shown, in order to enable a duplex hearing-speaking operation via the headset 12 and the intercom network with other members of the intercom network. Accordingly, an XLR connector of a prior art headset also has four sockets for contact pins.

Accordingly, four contact pins 24a, 24b, 24c, 24d are fixedly arranged on the housing bushing 18. FIG. 6 indicates schematically just two contact pins 24a, 24b. Here the electrical wiring is not shown in the interests of simplicity. The two contact pins 24a, 24b are connected to other electrical and electronic components, not shown, within the belt pack 17. The inventive intercom plug-in connector 10 now serves to connect a phone plug 14 of an audio device, such as a headset, with the housing socket 18 on the station 11.

For this purpose, the inventive intercom plug-in connector 10 is designed in the manner of an adapter.

It comprises a cylindrical housing 19 that—as shown for example in FIGS. 3e and 3f—has an essentially circular cross-section. The intercom plug-in connector 10 further comprises a first axial end 20 and a second axial end 21.

The first axial end 20 is designed as a plug-in extension 22. The plug-in extension 22 has an axial length 46 that essentially corresponds to the axial length 45 of the housing bushing 18. The plug-in extension 22 also has an external diameter 41 that is slightly smaller than the inside diameter 47 of the housing bushing 18.

In the example of embodiment of FIG. 1, four sockets 23a, 23b, 23c, 23d are arranged on the plug-in extension 22, in each of which a contact pin 24a, 24b, 24c, 24d is accommodated. In this respect the plug-in extension is designed as a XLR female plug-in extension 34.

On the second axial end 21 of the intercom plug-in connector 10 is arranged a phone jack 25 for purposes of receiving the phone plug 14. The phone jack 25 is of an essentially circular cylindrical design and extends along the central longitudinal axis 32 of the housing 19.

As is apparent in particular from the illustration of FIG. 6, there is an axial overlap 33 in the axial direction 27 between the sockets 23a, 23b, 23c, 23d for the contact pins 24a, 24b, 24c, 24d and the phone jack 25 for the phone plug 14. In this manner, the overall axial length 40 of the plug-in connector 10 can be kept very short.

As evidenced by the illustrations of FIGS. 4 and 5, for example, it can be seen that the housing 10 consists of a hollow body, preferably made of plastic, and in any event of an electrically insulating material. Contact elements 26a, 26b, 26c, 26d can be inserted or introduced into this hollow body. As can be seen in FIG. 4, for example, these can be fixed end-wise onto a closure plate 42. For axial retention of the closure plate 42 on the housing 19, a cover plug 43 can be provided that holds the individual parts of the plug-in connector 10 axially together. FIG. 4 also makes it clear that a closure ring 44 is still provided that seals the plug-in connector 10 externally.

As can be seen from FIG. 6, it is clear, for example, that the contact element 26a can have a first contact region 37a, with which it makes contact with a contact section on the phone plug 14. In addition, the same contact elements 26a can have a second contact region 38a that makes contact with a contact pin 24a on the housing bushing 18 of the belt pack 17. By this means, an electrical connection can be made between the corresponding electrical line in the connecting cable 13 and the corresponding contact pin on the station 11, that is to say, the belt pack 17.

It should be noted that in order to enable a duplex audio speech communication at least four electrical conductors run in the connecting line 13 of the headset 12, so that two independent current circuits are formed. Accordingly, the phone plug 14 also has at least four contact sections 15a, 15b, 15c, 15d (see FIG. 5) that are electrically insulated from one another that are each electrically separated from the insulating sections 16a, 16b, 16c, 16d.

An equal number of contact elements 26a, 26b, 26c, 26d is provided, corresponding to the number of contact sections 15a, 15b, 15c, 15d and the phone plug 14.

In the embodiments, four contact elements are therefore provided.

The invention also comprises intercom plug-in connectors, not shown that have more than four contact elements.

In order to achieve correct positioning of the plug-in connector 10 in the housing sleeve 18, an outwardly projecting rib 28 is provided for circumferential positioning. A corresponding recess 29 is located on the housing bushing 18, wherein said recess 29 is merely indicated in FIG. 7.

The phone jack 25 for the phone plug 14 has an inside diameter 31 that is about the same size or slightly larger than the external diameter 30 of the phone plug 14.

The figures also show an intercom plug-in connector 10 with an elastic, i.e. resetting design of spring extension 46 that has a latching nose with a displaceable retaining surface 35. When inserting the intercom plug-in connector 10 into the housing socket 18 a deflection movement of the spring extension 46 is brought about by a control surface, so that in the fully inserted state shown in FIGS. 6 and 7, the retaining surface 35 reaches a holding position shown there, and connects the plug-in connector 10 to the station 11, that is to say, to the belt pack 17 in an axially latching manner.

For purposes of releasing the plug-in connector 10 from the belt pack 17, that is to say, from the station 11, a force, in particular a downward force, can be exerted by the user on the right-hand free end 48 of the spring extension 36 as shown in FIG. 7, and the retaining surface 35 can be released from the locking phone jack on the housing bushing 18. By this means, the intercom plug-in connector 10 is released from the housing bushing 18.

The invention claimed is:

1. An intercom plug-in connector for audio connections, the connector comprising:
   a cylindrical housing of circular cross section extending axially and having a first axial end formed on a plug-in extension having a front face,
   four sockets on the front face relative to one another in an approximate V-shape for respective contact pins, and,
   at a second axially opposite end of the housing a phone jack for a phone plug, and
   a plurality of contact elements extending directly between the sockets at the front face and the phone jack at the second axially opposite end.

2. The intercom plug-in connector according to claim 1, wherein the contact elements are electrically insulated from one another in the phone jack for the phone plug.

3. The intercom plug-in connector according to claim 2, wherein each contact element can be connected to a respective one of a plurality of contact sections on the phone plug.

4. The intercom plug-in connector according to claim 1, wherein the intercom plug-in connector is designed for purposes of connecting an intercom audio device to an intercom network device.

5. The intercom plug-in connector according to claim 1, further comprising:
a radially outwardly projecting rib extending axially on the plug-in extension.

6. The intercom plug-in connector according to claim 1, wherein the phone jack for the phone plug has an inside diameter of 3.5 mm, or 2.5 mm.

7. The intercom plug-in connector according to claim 1, wherein the phone jack for the phone plug extends along a central longitudinal axis of the housing.

8. The intercom plug-in connector according to claim 1, wherein the phone jack for the phone plug and the four sockets for the contact pins overlap one another axially.

9. The intercom plug-in connector according to claim 1, wherein the plug-in extension is an XLR female plug-in extension.

10. The intercom plug-in connector according to claim 1, further comprising:
a retaining surface that can be displaced between a locking position and a release position provided on the housing.

11. An intercom plug-in connector for audio connections, the connector comprising:
a cylindrical housing extending axially and having a first axial end formed as a plug-in extension having a front face;
a plurality of sockets on the front face relative to one another in an approximate V-shape for respective contact pins of an intercom network device;
a phone jack for a phone plug at a second axially opposite end of the housing; and
a plurality of contact elements that are electrically insulated from one another in the phone jack for the phone plug, one of the contact elements having
a first contact region formed as an elastic spring contactable with a contact section on the phone plug and
a second contact region also formed as an elastic spring contactable with one of the contact pins of the intercom network device.

12. An intercom plug-in connector for audio connections, the connector comprising:
a cylindrical housing extending axially and having a first axial end having a front face and an axially opposite back face;
a plurality of sockets on the front face relative to one another in an approximate V-shape for respective contact pins of an intercom network device;
a phone jack for a phone plug at the axially opposite back end face of the housing; and
respective contact elements electrically insulated from one another in the in the housing and each having
a first contact region formed as an elastic spring contactable with a respective contact section on the phone plug and
a second contact region also formed as an elastic spring contactable with a respective one of the contact pins of the intercom network device.

13. The connector according to claim 12 wherein the intercom network device has an XLR connector having the contact pins.

* * * * *